((12)) United States Patent
Bovo et al.

(10) Patent No.: US 12,512,015 B2
(45) Date of Patent: Dec. 30, 2025

(54) INPUT DEVICE FOR THE SIMULATION OF LAPAROSCOPIC OPERATIONS

(71) Applicant: BBZ S.R.L., Vigasio (IT)

(72) Inventors: Francesco Bovo, Vigasio (IT); Davide Zerbato, Vago di Lavagno (IT)

(73) Assignee: BBZ S.R.L., Vigasio (IT)

( * ) Notice: Subject to any disclaimer, the term of this patent is extended or adjusted under 35 U.S.C. 154(b) by 199 days.

(21) Appl. No.: 18/555,606

(22) PCT Filed: Aug. 26, 2022

(86) PCT No.: PCT/IB2022/057997
§ 371 (c)(1),
(2) Date: Oct. 16, 2023

(87) PCT Pub. No.: WO2023/026243
PCT Pub. Date: Mar. 2, 2023

(65) Prior Publication Data
US 2024/0203288 A1    Jun. 20, 2024

(30) Foreign Application Priority Data

Aug. 27, 2021  (IT) .................. 102021000022391

(51) Int. Cl.
G09B 23/28      (2006.01)
A61B 34/10      (2016.01)

(52) U.S. Cl.
CPC ............ *G09B 23/285* (2013.01); *A61B 34/10* (2016.02)

(58) Field of Classification Search
CPC .............................. G09B 23/285; A61B 34/10
See application file for complete search history.

(56) References Cited

U.S. PATENT DOCUMENTS

2002/0033802 A1*  3/2002  Rosenberg ............. B25J 9/1689
                                                     345/156
2009/0176196 A1*  7/2009  Niblock ............... G09B 23/285
                                                     434/262

FOREIGN PATENT DOCUMENTS

EP    2 068 295 A2    6/2009
EP    2 738 756 A1    6/2014
RU    2 679 110 C1    2/2019

OTHER PUBLICATIONS

International Search Report and Written Opinion dated Nov. 23, 2022, issued in PCT Application No. PCT/IB2022/057997, filed Aug. 26, 2022.

* cited by examiner

*Primary Examiner* — Robert P Bullington
(74) *Attorney, Agent, or Firm* — Workman Nydegger

(57) ABSTRACT

An input device for the simulation of laparoscopic operations in a real or virtual environment includes: two handpieces, each having: a rod having the end adapted to simulate a laparoscopic instrument; a handle manoeuvrable by an operator applied to the rod; a trocar provided with a through hole in which the rod is inserted; a support frame provided with two seats each of which accommodates a trocar; and a sensor configured to control the movements of each trocar and of each rod. An elastic member stably constrains each trocar inside the respective seat and is configured to allow the rotation of each trocar for orienting the longitudinal axis with respect to the plane of the support frame with reference to a triad of reference axes (x, y, z) having the origin coincident with the centre of each trocar.

20 Claims, 6 Drawing Sheets

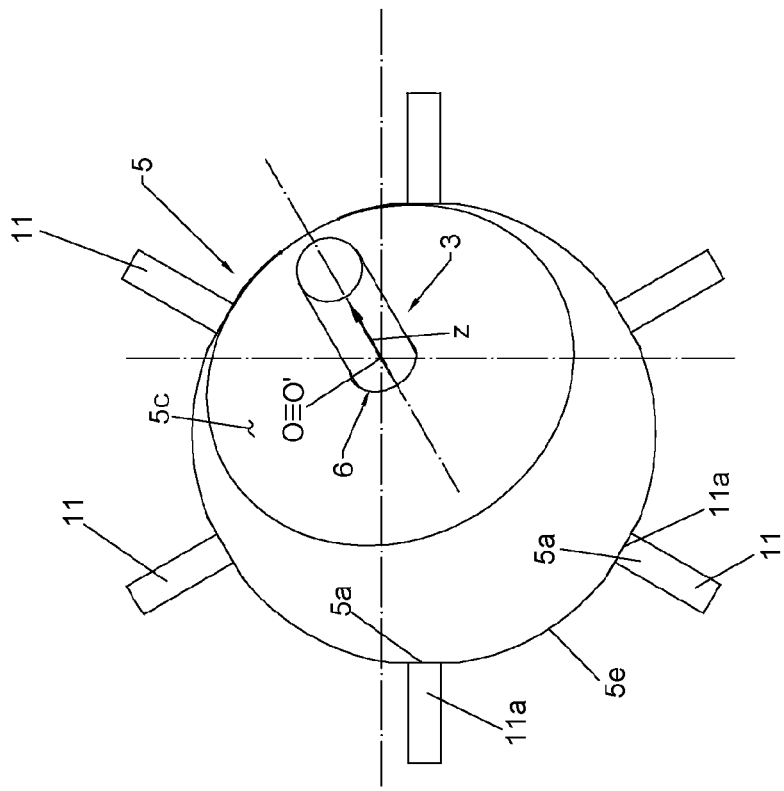
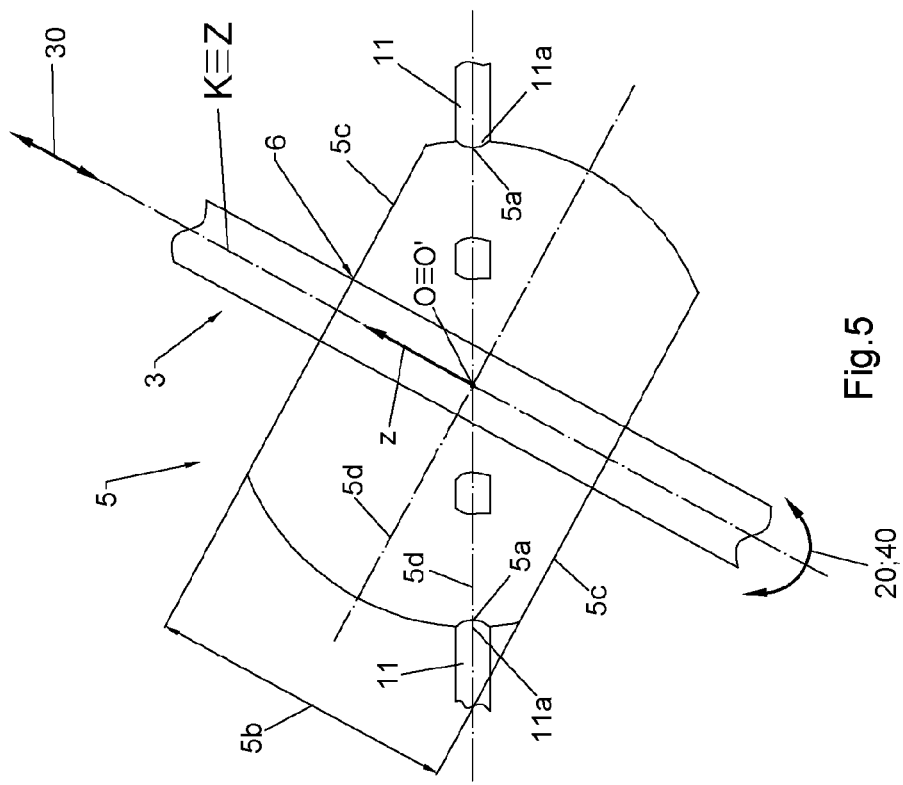

INPUT DEVICE FOR THE SIMULATION OF LAPAROSCOPIC OPERATIONS

BACKGROUND OF THE INVENTION

1. The Field of the Invention

The invention relates to an input device for the simulation of laparoscopic operations that allows to trace the movements and to measure the real or simulated displacements of laparoscopic instruments during a surgical procedure in a real or simulated environment.

The device of the invention is particularly suitable for training surgeons in the use of laparoscopic instruments and in the application of the relative techniques of laparoscopic operations so as to operate in a real or virtual environment.

2. The Relevant Technology

As is well known, laparoscopy is a surgical technique that allows examining and intervening on organs or tissues within the abdominal cavity, using one or more laparoscopic instruments that are introduced into the patient's body.

The laparoscopic instrument is introduced into the patient's body through a medical device that in the language of the sector is called a "port" or more commonly a "trocar" and which comprises a tubular body with predominantly longitudinal development having a pointed end that serves to pierce the patient's abdomen in the area of the operation.

The training of the surgeons takes place in real training environments using real instruments or in virtual training environments using appropriate input instruments; in both cases there is in any case a structure that performs the function of a "trocar" for the insertion of the real or simulated laparoscopic instrument.

The trocar is held in an essentially fixed but spatially adjustable position and through which a rod provided with a handle is inserted that the trainee uses to move the rod itself so that its free end, opposite the handle, interacts with a real or virtual scenario simulating the environment of the surgical operation.

If the environment of the surgical operation is real, it is framed by a camera.

Conversely, if the environment of the surgical operation is virtual, it is calculated by the computer.

In both cases the surgical environment is projected onto a screen.

During training, all the displacements of the end of the rod are traced and stored by a computer system.

It is well known that a variety of input devices are available on the healthcare equipment market that allow to simulate laparoscopic operations for the training of the surgeons.

According to a first embodiment, input devices are known comprising a handpiece provided with a handle connected to a rod provided with a maneuvering handle and inserted passing through a joining body housed and fixed stably in a seat belonging to a support structure.

The joining body performs the function of a trocar as it allows the axial displacement and also the articulation of the rod.

By appropriately moving the maneuvering handle, the rod can then be displaced linearly in both directions along the longitudinal axis that defines it, it can be rotated around the aforesaid longitudinal axis and also articulated in the space with reference to a fixed point defined by the joining body.

By means of appropriate sensors, for example a linear potentiometer that detects the linear displacement of the rod being advanced and moved backward, an encoder that detects its rotation with respect to its longitudinal axis or spherical wrists with encoder, the computer system of the input device, which cooperates operationally with these sensors, stores the coordinates of the different positions that the end of the rod assumes in space.

In this way it is possible to monitor the position and the movement of the end of the rod and thus to measure the movements of the end of the rod or to detect the position and the movement of a surgical instrument associated therewith, with reference to the virtual or real reality scenario reproduced on a screen that represents the virtual or real environment of the surgical laparoscopic operation.

In another different embodiment, the input device comprises, also in this case, a rod provided with a maneuvering handle but differs from the device previously described in that the rod is inserted passing through a spherical joint that performs the function of a trocar and which comprises a spherical body rotatably housed in a spherical seat belonging to a fixed support structure of the input device.

Also in this case, appropriate sensors allow to identify the different positions of the end of the rod and therefore to measure and possibly simulate the positions and the movements of the surgical instrument that is associated therewith.

However, both types of input devices described have a number of acknowledged drawbacks.

A first drawback derives from the fact that the known devices briefly described above have a remarkably complex mechanics and acknowledged realization difficulties that mainly concern the realization of efficient and reliable couplings between the mutually moving parts.

These mechanical difficulties in realizing efficient and reliable couplings can also be found in the fact that the displacements that the operator imposes on the rod during insertion/extraction in/from the trocar do not always take place with a uniform movement.

As a result, the disadvantage is that the sensors, usually a linear potentiometer, do not provide reliable values of the displacements of the rod.

Furthermore, the input devices of the type described, having the trocar consisting of a spherical joint, have the disadvantage that the measurement of the rotation of the rod around its axis is measured indirectly on the basis of the detection of the rotation of the spherical body in its seat, which is carried out by means of optical markers present on the surface of the same spherical body.

Therefore, since this is an indirect measurement, the accuracy of the detected value is not guaranteed.

SUMMARY OF THE INVENTION

The present invention is intended to overcome the claimed drawbacks.

It is therefore a first object of the present invention to realize an input device for the simulation of surgical laparoscopic operations in a virtual or real environment that presents a construction cost significantly lower than the construction cost of input devices of the prior art that are equivalent to it.

It is another object that the input device of the invention has simpler mechanics than input devices of the prior art that are equivalent to it.

It is a further object that the input device of the invention is also simpler in use and requires less maintenance than input devices of the prior art that are equivalent to it.

The listed objects are achieved by an input device having the characteristics according to the main claim to which reference will be made.

Other characteristics of the device of the invention are described in the dependent claims.

Advantageously, the input device of the invention, in view of its lower cost of manufacture, may be offered on the market at a more advantageous price than the devices of the prior art and may thus satisfy a wider user base.

Still advantageously, the invention offers the user the possibility of having a device which, at a lower cost than equivalent devices, associates a precision of operation comparable to these and in any case absolutely adequate for achieving the objects for which these devices are used.

BRIEF DESCRIPTION OF THE DRAWINGS

The aforesaid objects and advantages will be better highlighted during the description of a preferred embodiment of the input device of the invention which is given below by referring to the attached drawing tables in which:

FIGS. 5 to 7 represent different views of a detail of the device of the invention.

DETAILED DESCRIPTION OF THE PREFERRED EMBODIMENTS

Figure 1:
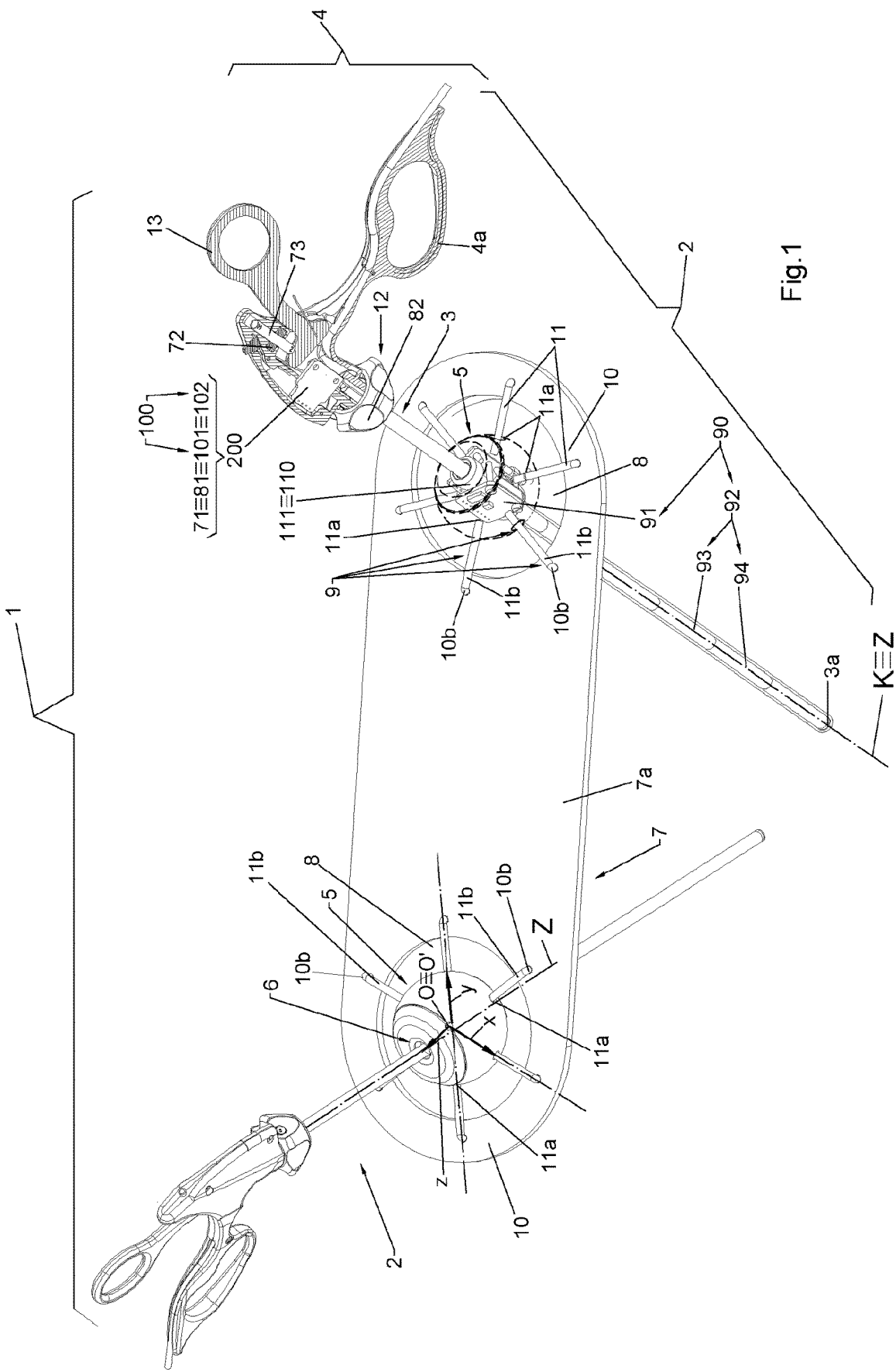
FIG. 1 represents an axonometric and partially sectional view of the device of the invention.
Figure 2:
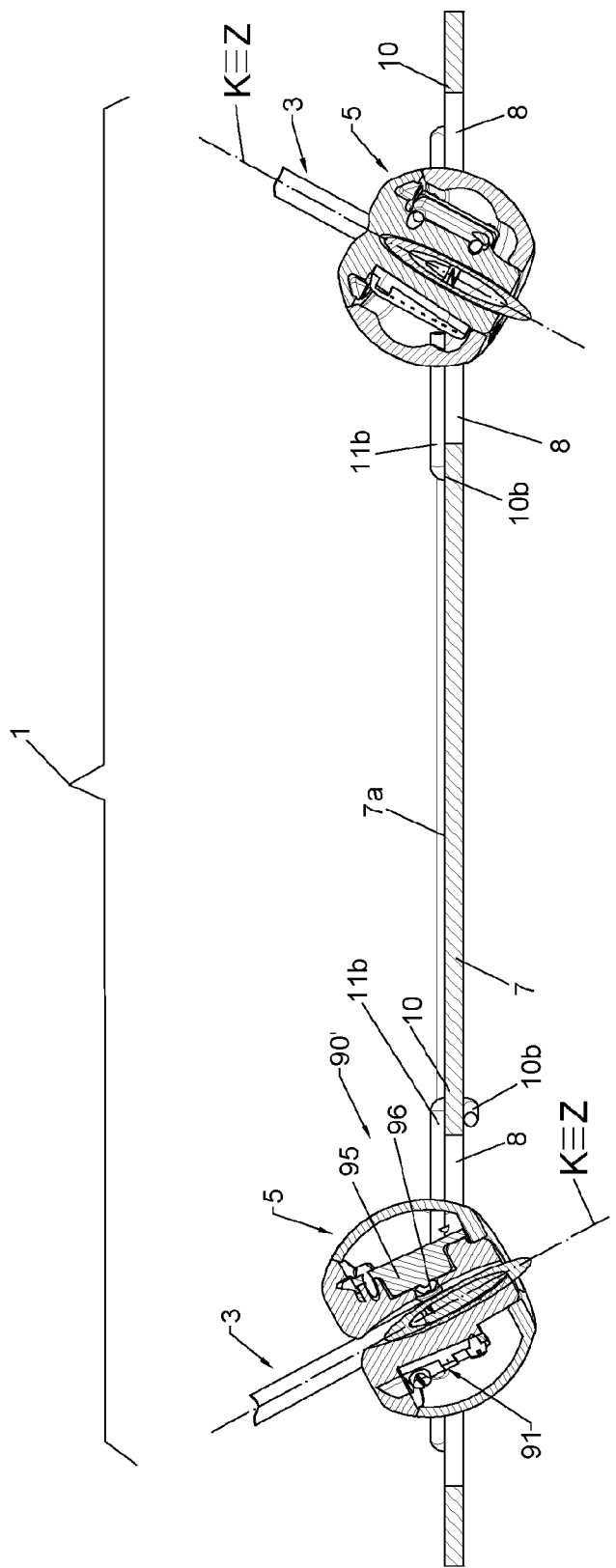
FIG. 2 represents a longitudinal section of FIG. 1.

The input device for the simulation of laparoscopic operations subject-matter of the invention is represented in the axonometric views of FIGS. 1 and 2 where it is indicated overall with 1.

In addition, special elements of the input device of the invention are represented in FIGS. 3 to 7.

Hereinafter, for the sake of descriptive simplicity, the input device 1 of the invention will simply be referred to by the word of device 1.

It should be noted, as already mentioned above, that the device 1 of the invention is used to train surgeons in the use of laparoscopic instruments and in the application of relative techniques of laparoscopic operation.

In particular, the device 1 of the invention can be employed to train surgeons in real training environments using real instruments or in virtual training environments using appropriate input instruments.

In both cases there is a structure arranged in a substantially fixed but orientable position in the space that performs the function of a "trocar" for the insertion of the real or simulated laparoscopic instrument.

If the environment of the surgical operation is real, it is framed by a camera; if, conversely, it is virtual, it is calculated by the computer; in both cases, the surgical environment in which the operation takes place is projected onto a screen.

With reference to the aforesaid Figures, the preferred embodiment of the device 1 of the invention is described below, which comprises two handpieces 2 that can be observed in FIGS. 1 and 2 and that are both hold simultaneously by the user to simulate surgical laparoscopic operations.

This embodiment is therefore the preferred one for the activity of learning and simulation of the operations.

Nothing, however, prevents that in a different embodiment, not represented, the device 1 of the invention can be made in a version that provides for the presence and the use of a single handpiece 2 or more than two handpieces that require the intervention of two operators in this case.

Figure 3:
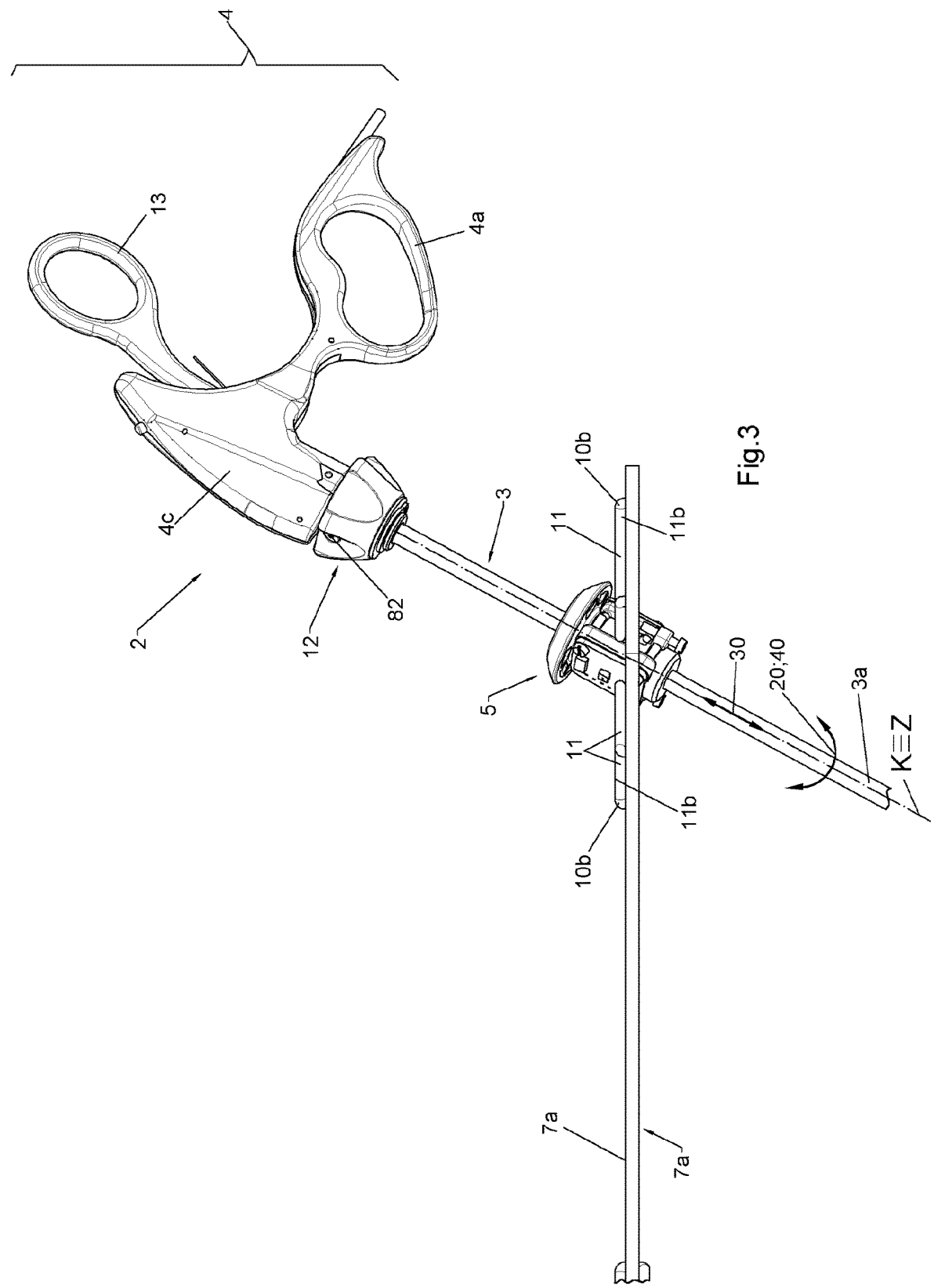
FIG. 3 represents a partial view of FIG. 1.
Figure 4:
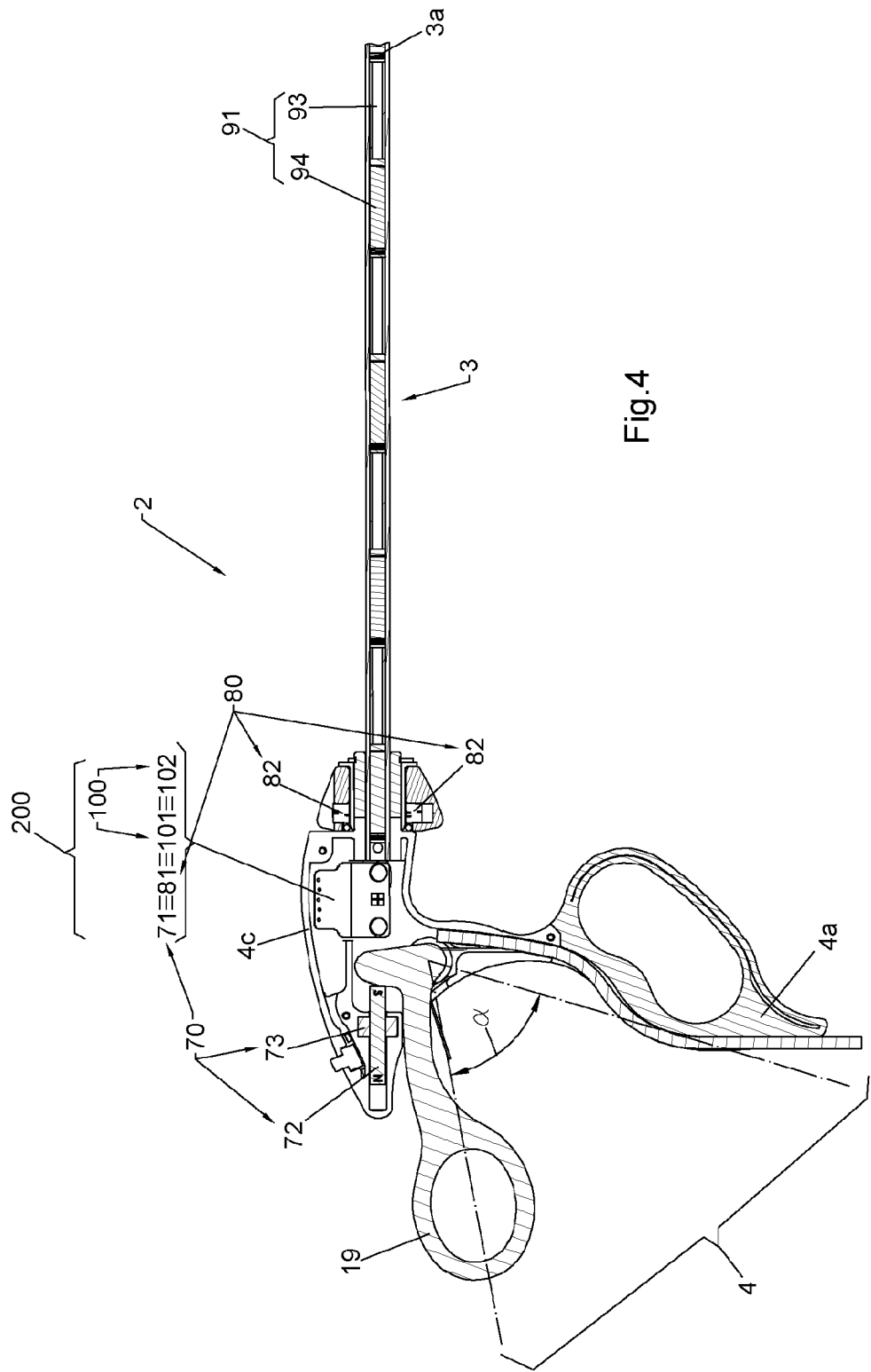
FIG. 4 represents a longitudinal sectional view of a detail of the device of the invention represented in FIGS. 1 and 3.

It can be observed in particular in FIGS. 1 to 3 that each handpiece 2, also represented in the longitudinal section of FIG. 4, comprises a rod 3 that identifies a longitudinal direction K and that constitutes the input device whose end 3a simulates a laparoscopic instrument that is displaced in the various areas of the surgical operation.

In the represented views, the device 1 of the invention simulates the operation in a virtual environment and traces the positions of the end 3a of the rod 3 that are stored and projected onto a screen.

Otherwise, by associating a real surgical instrument with the end 3a of the rod 3, a real environment simulation is obtained that is filmed by a camera and displayed on a screen.

The rod 3 is also provided with a handle 4 maneuverable by the operator and comprises a body 4c provided with a fixed arm 4a applied to the rod 3.

Preferably, but not necessarily, the handle 4 also comprises a movable arm 13 which is rotatably pivoted elastically to the body 4c of the handle 4 and can be articulated like a compass with respect to the fixed arm 4a.

This preferable executive configuration makes it possible to manoeuvre a real surgical instrument, for example pliers or a pair of scissors applied to the end 3a of the rod 3 and detect its opening angle.

Preferably, but not necessarily, the handpiece 2 also comprises an annular ferrule 12 placed downstream of the body 4c of the handle 4, coaxially coupled to the outside of the rod 3 and idle with respect to the rod 3 and also with respect to the handle 4.

The device 1 also comprises two trocars 5 which can be observed in FIGS. 1 and 2, each of which is provided with a through hole 6 which performs the function of a guide for the rod 3.

Constructively, the trocar 5 can be a tubular trocar of known type or it could also consist of any solid body however configured.

In the preferred embodiment described herein, each trocar 5 has the shape of a ball and will in fact be referred to below as the ball-trocar 5.

However, it is understood that the trocar 5 can take any shape.

The through hole 6 identifies a longitudinal axis Z and in the through hole 6 the rod 3 is inserted whose longitudinal direction K coincides with the longitudinal axis Z of the through hole 6.

In the embodiment described and as can be observed in FIG. 5, the longitudinal axis Z coincides with the axis of symmetry of the ball-trocar 5.

In other embodiments, the longitudinal axis Z could not be coincident with the axis of symmetry of the ball-trocar 5.

The device 1 also comprises a support frame 7 provided with two seats 8 each of which accommodates a ball-trocar 5 which, as will be described in more detail below, is moved in a controlled manner in the space by the operator who, by maneuvering the handle 4, displaces the rod 3.

Finally, the device 1 also comprises sensor means that are configured to control the movements:

of the movable arm 13 of each handle 4 with respect to the fixed arm 4a;

of each ball-trocar 5;

of each rod 3.

According to the invention, the device 1 comprises elastic means 9 which stably constrain each ball-trocar 5 to the inner perimeter edge 10 of the respective seat 8 and which are configured to:

prevent the rotation of each ball-trocar 5 according to the longitudinal axis Z;

allow the rotation of each ball-trocar 5 for orienting the longitudinal axis Z with respect to the plane 7a of the support frame 7 with reference to a triad of reference axes x, y, z having the origin O coincident with the centre of the ball-trocar 5 and comprising a first axis x and a second axis y belonging to a plane intersecting the longitudinal axis Z and a third axis z coinciding with the longitudinal axis Z of the ball-trocar 5.

According to the particular but not exclusive embodiment described, the longitudinal axis Z coincides with the axis of symmetry of the ball-trocar 5, it is orthogonal to its diametrical plane 5d and the triad of reference axes x, y, z is a triad of Cartesian axes.

However, other embodiments are also possible in which the longitudinal axis Z does not coincide with the axis of symmetry of the ball-trocar 5, it is not orthogonal to its diametrical plane 5d and the triad of reference axes x, y, z is not a triad of Cartesian axes.

As regards the elastic means 9, they are fixed between the outer surface of the ball-trocar 5 and the inner perimeter edge 10 of the seat 8.

This prevents the ball-trocar 5 from rotating around the longitudinal axis Z with respect to the seat 8, ensuring a single stable equilibrium position of the ball-trocar 5 around said longitudinal axis Z.

The measurement of the position of the rod 3 is therefore carried out with respect to a reference system that is not subject to unwanted rotations, improving the accuracy of this measurement.

In an embodiment of the invention, as can particularly be observed in FIGS. 1, 3, 5, 6 and 7, said elastic means 9 comprise a plurality of elastic tie rods 11 with predominantly longitudinal development, each of which has the first end 11a constrained to first constraining means 5a present on the outer surface of the respective ball-trocar 5 and the second end 11b constrained to second constraining means 10b present along the inner perimeter edge 10 of the seat 8.

Furthermore, the first constraining means 5a are arranged at an equal distance from each other along the diametrical circumference 5e of the ball-trocar 5 and similarly the second constraining means 10b are arranged at an equal distance from each other along the perimeter edge 10 of the seat 8.

According to other embodiments, the first constraining means 5a and the second constraining means 10b may be arranged at different distances from each other.

Preferably, the elastic tie rods 11 can be arranged according to any configuration but, preferably, they are arranged according to a configuration that in plan presents a symmetrical shape.

By way of example, in the embodiment described, the elastic tie rods 11 are arranged coplanar to the diametrical plane 5d and according to the regular hexagon-shaped configuration that can be observed in FIG. 1 and in FIG. 6.

From a constructive point of view, the elastic tie rods 11 can be formed by filiform elements in elastomer or by springs or by variously configured elastic membranes.

However, regardless of their embodiment, the elastic tie rods 11 confer on the ball-trocar 5 an elasticity that realistically mimics the behaviour of the patient's tissues.

Furthermore, the elastic tie rods 11, while conferring elasticity on the ball-trocar 5 they support, prevent the ball-trocar 5 from rotating according to the longitudinal axis Z.

The ball-trocar 5 performs the function of guiding the rod 3 and therefore, as mentioned above, it could take the shape of any tubular trocar of known type or it could also be constituted by any solid body however configured.

In the preferred embodiment described herein, each ball-trocar 5, with particular reference to FIGS. 5 and 6, has the shape of a spherical segment 5b defined by a diametrical plane 5d on which the elastic means 9 lie and by two bases 5c parallel to each other, inclined and symmetrically arranged on opposite sides of the diametrical plane 5d.

It can be observed that the through hole 6 is orthogonal to the bases 5c, and is inclined with respect to the diametrical plane 5d on which the elastic means 9 lie.

Furthermore, the longitudinal axis Z defined by the through hole 6 is orthogonal to the diametrical plane 5d parallel to the bases 5c and therefore constitutes the axis of symmetry of the spherical segment 5b in which the origin O of the triad of axes x, y, z belongs to the aforesaid longitudinal axis Z and coincides with the centre of the ball-trocar 5.

With regard to the movements of the rod 3, they comprise:

a rotation movement 20 of the rod 3 around the longitudinal direction K defined by the rod 3 itself;

a translation movement 30 through the through hole 6 of the ball-trocar 5 for the insertion and the extraction of the rod 3 according to the longitudinal axis Z coincident with the third axis z;

a roll movement 40 of the rod 3 around said longitudinal direction K defined by said same rod 3.

It should be specified that the rotation movement 20 of the rod 3 can also be obtained by rotating the handle 4 or the ferrule 12, if this is fixed to the rod 3, thus simulating a real situation of use of a real instrument.

If, conversely, like in the embodiment described, the ferrule 12 is idle with respect to the handle 4 and with respect to the rod 3, its rotation, which is detected by the sensors, is interpreted by the simulation software as the rotation of the simulated surgical instrument applied to the end 3a of the rod 3 and must be added to the rotation of the rod 3 itself.

Figure 7:
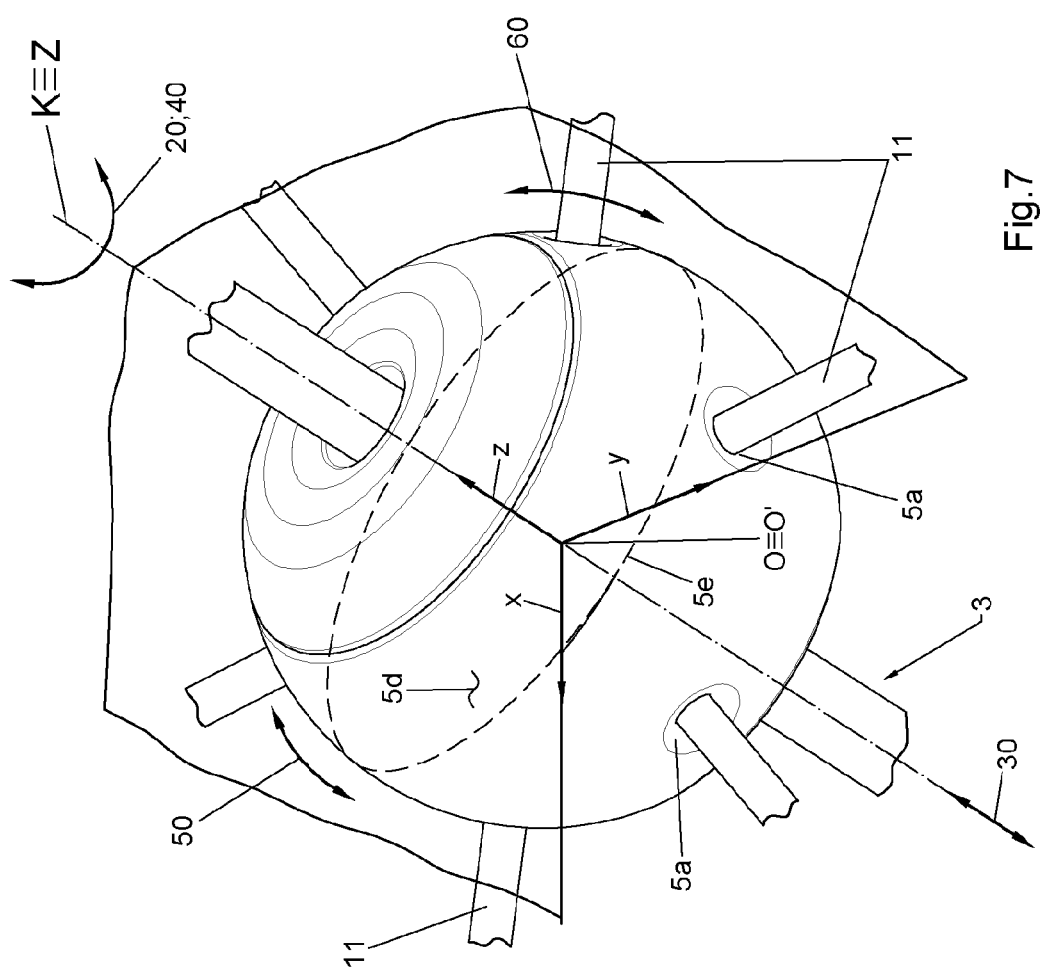

As regards, on the other hand, the movements of the ball-trocar 5, they are represented in FIG. 7 and comprise:

a yaw movement 50 to which the rotation of the rod 3 in the plane defined by the first axis x and by the longitudinal axis Z coincident with the third axis z corresponds;

a pitch movement 60 to which the rotation of the rod 3 in the plane defined by the second axis y and by the longitudinal axis Z coincident with the third axis z corresponds.

The movements of the rod 3 and of the ball-trocar 5 are detected by sensor means that will be better specified and described below.

Furthermore, each movement of the ball-trocar 5 with associated the rod 3 for orienting the longitudinal axis Z with respect to the plane 7a of the support frame 7 is defined by the composition of a yaw movement 50 with a pitch movement 60 and occurs when an operator manoeuvres the handle 4 and rotates the ball-trocar 5 by means of the rod 3 inserted inside the through hole 6.

Substantially, the rod 3 and the respective ball-trocar 5 define a polar kinematic structure having the pole O' coinciding with the origin O of the aforesaid triad of axes x, y, z and with the centre of the ball-trocar 5.

With regard to the sensor means, they comprise first sensor means 70, which are represented as a whole in FIGS. 1 and 4 and are configured to detect the value of the angle of rotation α of the movable arm 13 of the handle 4 with respect to the fixed arm 4a.

In particular, it can be observed that the first sensor means 70 comprise a magnetometer 71 belonging to an inertial platform 200 housed in the body 4c of the handle 4 and operatively connected to a cylindrical magnet 72 with north-south axial polarization, also housed in the body 4c of the handle 4, placed in contact with the movable arm 13 and axially sliding inside a fixed magnetic ring 73 with north-south axial polarization.

The magnetometer 71 determines the position of the cylindrical magnet 72 which is proportional to the angle of rotation α of the movable arm 13 of the handle 4 with respect to the fixed arm 4a.

In this way, the detection of the angle of rotation α makes it possible to determine the displacement of a laparoscopic instrument applied to the end 3a of the rod 3, for example the opening angle of the claws of pliers or of a pair of scissors.

Advantageously, the fixed magnetic ring 73 acts as a sliding bush of the cylindrical magnet 72 and the magnetic support that is generated between the cylindrical magnet 72 and the magnetic ring 73 allows to guide the translation movement of the cylindrical magnet 72 in the absence of substantial friction.

Equally advantageously, the equal magnetic polarization of the magnetic ring 73 and of the cylindrical magnet 72 allows the further advantage of spontaneously returning the cylindrical magnet 72 and the magnetic ring 73 always into the equilibrium position and without the need to provide for the use of recall springs when the action of displacement of the cylindrical magnet 72 by the movable arm 13 ceases.

The sensor means also comprise second sensor means 80 which are configured to detect the rotation movement 20 of the rod 3 around the longitudinal direction K defined by the rod 3 itself.

The aforesaid second sensor means 80 can be observed in FIGS. 1 and 4 and comprise a magnetometer 81, belonging to the same inertial platform 200 contained in the body 4c of the handle 4, which is operatively connected to a pair of magnets 82 that are associated with the annular ferrule 12 and are positioned so as to attract each other.

The annular ferrule 12 which, as has been said, is idle and coaxial externally to the rod 3, when rotated allows to simulate the rotation of the rod 3 around itself and therefore according to the longitudinal direction K that it defines.

The sensor means also comprise third sensor means 90; 90' which are configured to detect the translation movement 30 through the through hole 6 of the ball-trocar 5 for the insertion and the extraction of the rod 3 according to the longitudinal axis Z.

The aforesaid third sensor means 90, according to a possible and non-exclusive embodiment that can be observed in FIGS. 1 and 4, comprise a magnetometer 91 placed inside the ball-trocar 5 and operatively connected to a magnetic line 92 formed inside the rod 3 by a plurality of magnets 93 arranged aligned and interspersed from each other by means of non-magnetic spacers 94.

However, executive variants that provide for the use of magnetic lines of a different realisation are possible.

According to an embodiment variant represented in FIG. 2, it can be observed that the third sensor means 90' comprise a trackball 95 housed in the ball-trocar 5 and having the ball 96 placed in contact with the rod 3 which is rotated by the rod 3 itself when it is inserted or extracted into/from the through hole 6.

In this embodiment variant, the rod 3 will not be provided with magnets.

The sensor means also comprise fourth sensor means 100 which are configured to detect the roll movement 40 of the rod 3 around the longitudinal direction K defined by the rod 3 itself.

The aforesaid fourth sensor means 100 can be observed in FIGS. 1 and 4 and comprise an accelerometer 101 and a gyroscope 102 belonging to the same inertial platform 200 contained in the body 4c of the handle 4.

According to an embodiment variant, a potentiometer or an encoder, not represented in the figures and contained in the body 4c of the handle 4, can be used in place of the second sensor means 80 comprising the magnetometer 81 and the pair of magnets 82.

According to a further embodiment variant, a potentiometer or an encoder, not represented in the figures and contained in the body 4c of the handle 4, can be used in place of the first sensor means 70 comprising the magnetometer 71 and the cylindrical magnet 72.

The sensor means also comprise fifth sensor means 110 that are configured to detect the movement-rotation of the ball-trocar 5 for orienting the longitudinal axis Z of the ball-trocar 5 with respect to the plane 7a of the support frame 7.

Preferably but not exclusively, the fifth sensor means 110 comprise an accelerometer 111 associated with the ball-trocar 5.

In an embodiment variant, not represented in the figures, the fifth sensor means 110 comprise a magnetometer associated with the ball-trocar 5 and operatively connected with a magnet associated with the plane 7a of the support frame 7.

According to an alternative embodiment, the magnetometer could be integral with the frame 7 and the magnet could be associated with the ball-trocar 5.

Operationally, the trainee uses the device 1 of the invention and interacts with a real or virtual reality scenario that is projected onto a screen and in which the real or virtual operation environment is displayed.

The operator, by means of the handle 4, manoeuvres the rod 3 and the ball-trocar 5 and performs the movements that have been previously described so as to displace the end 3a of the rod 3 that simulates the laparoscopic instrument in the various areas of the real or virtual environment of the surgical operation.

The control of the movements, the tracing of the positions of the end 3a of the rod 3 and the storage of the collected data are entrusted to computer means, which comprise memory means in which a computer program is stored, and to at least one microprocessor that executes the aforesaid computer program.

According to what is described, the input device 1 of the invention achieves the predetermined purposes and advantages.

First of all, the aim of realizing an input device for the simulation of surgical laparoscopic operations is achieved which presents a significantly lower production cost than the production cost of input devices of the prior art that are equivalent to it.

In fact, by applying the teaching of the invention in the realization of the ball-trocar 5 supported and constrained by the elastic tie rods 11 inside the seat 8 that accommodates it, the number of mechanical components in mutual movement is significantly reduced to the advantage of a lower construction complexity, a lower assembly difficulty and also a lower wear of the device 1 of the invention with respect to equivalent devices of the prior art.

Advantageously, this also results in a lower manufacturing cost.

In addition, the replacement of mechanical components with elastic elements also ensures less need for repair and/or maintenance work.

Advantageously and unlike the prior art, the elastic tie rods 11 confer on the ball-trocar 5 an elasticity that realistically mimics the behaviour of the patient's tissues.

In the execution phase, modifications and variations not represented and not described in the present patent document may be made to the device of the invention.

However, should the aforesaid modifications and variations fall within the content of the claims below, they shall be deemed to be protected by this patent.

The invention claimed is:

1. An input device for simulation of laparoscopic operations in a real or virtual environment comprising:
at least one handpiece which comprises:
a rod identifying a longitudinal direction (K) and having an end adapted to simulate a laparoscopic instrument;
a handle maneuverable by an operator and comprising a body provided with a fixed arm applied to said rod;
at least one trocar provided with a through hole whose longitudinal axis (Z) identifies a longitudinal axis of said trocar and in which said rod is inserted whose longitudinal direction (K) coincides with said longitudinal axis (Z) of said through hole;
a support frame provided with at least one seat that accommodates said trocar;
sensor means configured to sense movements of said trocar and of said rod,
elastic means that stably constrain said trocar inside the at least one seat, said elastic means being configured to:
allow rotation of said trocar for orienting said longitudinal axis (Z) with respect to a plane of said support frame with reference to a triad of reference axes (x, y, z) having an origin (O) coincident with a centre of said trocar and comprising a first axis (x) and a second axis (y) belonging to a plane intersecting said longitudinal axis (Z) and a third axis (z) coincident with said longitudinal axis (Z) of said trocar;
wherein said elastic means comprises at least one resiliently elastic member that extends between an outer surface of said trocar and an inner perimeter edge of said seat.

2. The device according to claim 1, wherein said at least one resiliently elastic member comprises a plurality of elastic tie rods with predominantly longitudinal development, each of said elastic tie rods having a first end fixed to first constraining means present on the outer surface of said trocar and a second end fixed to second constraining means present along said inner perimeter edge of said seat.

3. The device according to claim 1, wherein said handle also comprises a movable arm rotatably pivoted elastically to said body of said handle and movable like a compass with respect to said fixed arm.

4. The device according to claim 1, comprising an annular ferrule placed downstream of said body of said handle and coupled coaxially to an outside of said rod.

5. The device according to claim 1, wherein said movements of said rod comprise:
a rotation movement of said rod around said longitudinal direction (K) of said rod;
a translation movement through said through hole of said trocar for the insertion and the extraction of said rod according to said longitudinal axis (Z) coincident with said third axis (z);
a roll movement of said rod around said longitudinal direction (K) defined by said same rod,
and in that said movements of said trocar comprise:
a yaw movement to which the rotation of said rod in the plane defined by said longitudinal axis (Z) and by said first axis (x) corresponds,
a pitch movement to which the rotation of said rod in the plane defined by said longitudinal axis (Z) and by said second axis (y) corresponds,
said movements of said rod and of said trocar being detected by said sensor means.

6. The device according to claim 5, wherein each movement of said trocar with associated said rod for orienting said longitudinal axis (Z) with respect to said plane of said support frame is defined by a composition of a yaw movement with a pitch movement.

7. The device according to claim 1, wherein said rod and said trocar define a polar kinematic structure having a pole (O') coinciding with said origin (O) of said triad of reference axes (x, y, z) and with the centre of said trocar.

8. The device according to claim 3, wherein said sensor means comprise first sensor means which are configured to detect a value of an angle of rotation of said movable arm with respect to said fixed arm, and in that said first sensor means comprise a magnetometer belonging to an inertial platform housed in the body of said handle and operatively connected to a cylindrical magnet, also housed in the body of said handle, placed in contact with said movable arm and sliding axially within a fixed magnetic ring.

9. The device according to claim 4, wherein said sensor means also comprise second sensor means configured to detect said rotation movement of said rod around said longitudinal direction (K) defined by said rod, and in that said second sensor means comprise a magnetometer, belonging to an inertial platform contained in the body of said handle, operatively connected to a pair of magnets associated with said annular ferrule and positioned so as to attract each other.

10. The device according to claim 3, wherein said sensor means also comprise third sensor means which are configured to detect said translation movement through said through hole of said trocar for insertion and extraction of said rod according to said longitudinal axis (Z).

11. The device according to claim 10, wherein said third sensor means comprise a magnetometer placed inside said trocar and operatively connected to a magnetic line formed inside said rod by a plurality of magnets arranged aligned and interspersed from each other by means of non-magnetic spacers.

12. The device according to claim 10, wherein said third sensor means comprise a trackball housed in said trocar and having the trackball placed in contact with said rod.

13. The device according to claim 3, wherein said sensor means also comprise fourth sensor means which are configured to detect said roll movement of said rod around said longitudinal direction (K) defined by said same rod.

14. The device according to claim 13, wherein said fourth sensor means comprise an accelerometer and a gyroscope which belong to an inertial platform housed in the body of said handle.

15. The device according to claim 3, wherein said sensor means also comprise fifth sensor means which are configured to detect said movement of said trocar for the orientation of said longitudinal axis (Z) of said trocar with respect to the plane of said support frame.

16. The device according to claim 15, wherein said fifth sensor means comprise an accelerometer associated with said trocar.

17. The device according to claim 15, wherein said fifth sensor means comprise a magnetometer associated with said trocar, operatively connected to a magnet associated with said plane of said support frame.

18. The device according to claim 1, wherein said trocar is a ball-trocar that has a shape of a spherical segment defined by at least one diametrical plane to which said first axis (x) and said second axis (y) of said triad of reference axes (x, y, z) belong and by two bases which are parallel and symmetrically arranged on opposite sides of said diametrical plane, in said ball-trocar said through hole intersecting said bases and said diametrical plane and said longitudinal axis (Z) coinciding with said third axis (z) of said triad of reference axes (x, y, z).

19. The device according to claim 1, wherein the at least one resiliently elastic member comprise a plurality of elastic tie rods, each of the plurality of elastic tie rods having a first end secured to the outer surface of the trocar and a second end secured to the inner perimeter edge of the seat.

20. An input device for the simulation of laparoscopic operations in a real or virtual environment comprising:
    at least one handpiece which comprises:
        a rod identifying a longitudinal direction and having an end adapted to simulate a laparoscopic instrument;
        a handle maneuverable by an operator and comprising a body provided with a fixed arm applied to said rod;
        a trocar provided with a through hole whose longitudinal axis identifies a longitudinal axis of said trocar and in which said rod is inserted whose longitudinal direction coincides with said longitudinal axis of said through hole;
        a support frame provided with at least one seat that accommodates said trocar; and
        a plurality of elastic tie rods that are spaced apart and that extend between an outer surface of said trocar and an inner perimeter edge of said seat so that said trocar is supported by the plurality of elastic tie rods.

* * * * *